United States Patent [19]
Jabr

[11] Patent Number: 5,471,455
[45] Date of Patent: Nov. 28, 1995

[54] HIGH DENSITY OPTICAL STORAGE SYSTEM

[76] Inventor: Salim N. Jabr, 2703 Doverton Sq., Mountain View, Calif. 94040

[21] Appl. No.: 245,023

[22] Filed: May 17, 1994

[51] Int. Cl.⁶ .......................................................... G11B 7/00
[52] U.S. Cl. ................ 369/107; 369/44.37; 369/124; 369/275.1; 369/275.4; 369/109
[58] Field of Search .................... 369/107, 275.4, 369/275.1, 111, 275.3, 44.37, 44.29, 44.28, 124, 44.26, 110, 109

[56] References Cited

U.S. PATENT DOCUMENTS

| | | | |
|---|---|---|---|
| 4,556,967 | 12/1985 | Braat | 369/275.4 |
| 4,893,298 | 1/1990 | Pasman et al. | 369/275.4 |
| 5,144,552 | 9/1992 | Abe | 369/275.4 |
| 5,153,863 | 10/1992 | Noda et al. | 369/109 |
| 5,412,631 | 5/1995 | Komma et al. | 369/109 |
| 5,430,704 | 7/1995 | Maeda | 369/124 |

OTHER PUBLICATIONS

Alan B. Marchant, Optical Recording A Technical Overview, Addison–Wesley Publishing Company, pp. 262–267, 1990.
Fai H. Mok, Angle–Multiplexed Storage of 5000 Holograms in Lithium Niobate, Optics Letters, vol. 18, pp. 915–917, Jun. 1993.
Ken C. Pohlmann, Advanced Digital Audio, Chapter 6, SAMS 1991, pp. 167–201.
S. N. Jabr, "Surface Roughness Measurement by Digital Processing of Nomarski Phase Contrast Images", Optics Letters vol. 10, p. 526 (1985).

*Primary Examiner*—Georgia Y. Epps
*Assistant Examiner*—Kim-Kwok Chu
*Attorney, Agent, or Firm*—Flehr, Hohbach, Test & Albritton

[57] ABSTRACT

Digital information is represented by surface steps orthogonal to the surface of a record carrier, said steps having a plurality of values between one tenth and 10,000 nanometers. The steps are read out by an optical differential interference method that is capable of resolving one tenth of a nanometer. The steps are written by a repeated masking and etching technique to form a master record carrier on glass from which a stamper is formed by molding and used to stamp replicate record carriers in polymeric material. In a different embodiment of the record carrier the surface steps are created by a modulated laser beam that ablates an integral number of layers from a pre-coated multilayer structure. In a third embodiment the data is represented by modulating the index of refraction between spots on a thin material film. The index difference is written optically. An extension to multiple thin film layers is also disclosed. An optically writeable embodiment of the invention is presented wherein the surface steps are produced by ablating a surface, utilising optical energy pulses.

19 Claims, 7 Drawing Sheets

HIGH DENSITY OPTICAL STORAGE SYSTEM

FIELD OF THE INVENTION

This invention relates to dynamic information storage systems, such as those utilized in computing systems, data storage, video storage and compact disk records, and relates more particularly to such systems wherein the retrieval is done by optical means. This invention is concerned with the storage of very large amounts of data per unit area of the storage medium and the fast retrieval of such data records.

BACKGROUND OF THE INVENTION

The optical recording and readout of data has been described by numerous authors. Chapter 6 in the book "Advanced Digital Audio", Edited by Ken C. Pohlmann, SAMS, 1991; gives a comprehensive account of the present state of optical disk technology. Such recording systems are classified into Read Only Media (ROM) which can only be read out optically but have to use a different recording method; Write Once Read Many (WORM) media which can be written optically but only once, and Erasable Write Many Media which can be repeatedly written and read.

Optical recording and retrieval systems are limited in the density of data that can be recorded and read by the natural laws of lightwave diffraction. Such laws make it impossible to focus a light beam to a spot smaller in diameter than the wavelength of the light. Present systems are also limited in the speed of readout by the amount of light power or brightness that can be focussed to a very small diameter spot.

This has led to efforts to develop shorter wavelength high brightness light sources or Lasers. However such lasers emitting blue or shorter wavelengths have proved difficult to make and remain short lived, unreliable and expensive to produce. Other efforts have sought to defeat the effects of diffraction by keeping the recording medium very close to the output port of sub-wavelength sized fiber waveguides. Such waveguides are made by tapering glass fibers from hundred micron diameters down to a fine point of sub micron size diameter. Light launched into the large diameter side travels to the fine tip where it exits towards the recording medium. The drawback of such systems is the very large loss of light power caused by the tapered guides which causes very low light levels on the medium and severely limits the readout speed and write capability.

Another approach to increasing data densities utilizes holographic recording in three dimensional media. In such systems the interference pattern between a data carrying beam and a reference light beam is recorded in a light sensitive medium. By varying the angle between these beams independent records can be superimposed in a medium and selectively read out as described by F. H. Mok in Optics Letters, vol. 18, p.915 (1993). The disadvantages of such methods have been the difficulty of developing media sensitive in the wavelength range of available lasers; the complexity of optical readout systems with angular resolution; the instability of the records over time and temperature and the incompatibility of these systems with the presently utilized means of tracking and focussing.

Furthermore traditional optical data recording systems consist of a storage medium usually in disk form, with binary digital data recorded thereupon in the form of two physically distinct states. Thus since only two distinct states are used per recording spot or pixel, only one bit of information can be recorded per pixel. A variety of techniques are used to affect a change in the intensity or polarization of the light reflected from the recording surface. The techniques utilizing intensity modulation include the creation of small and large pits, the modulation of the distance between pits and the creation of bumps on a generally flat surface. Light from a laser source is focussed onto the data recording areas and then reflected back to a photodetector which transforms the power received into a proportional electrical current. While the disk is rotating, ones and zeroes are read out as high and low current levels in the photodetector.

The techniques utilizing polarization modulation include causing a change in the crystalline phase of the recording medium material, or a change in the state of magnetization. A polarized light beam is then focussed onto the data recording areas and suffers a change in its state of polarization upon reflection. The change in polarization is sensed by a detector-polarizer combination.

Because of noise and drift in the optical power from the lasers and because of possible asperities and dust particles in the beam path as well as the noise generated in the associated electronics; the modulation of intensities or polarizations used must be kept large. This has traditionally limited the modulation states to only two: high and low, corresponding to binary ones and zeroes and limiting storage to one bit per spot. Accordingly storage densities on all optically read disks are limited presently to $10^8$ bits/cm$^2$ by light diffraction. These optical records are used in computer systems for data storage, entertainment systems for audio, video and program storage and in general data archiving systems.

One notes that prior art systems generally fail to concentrate a large enough optical power onto a small enough surface area to achieve high density recording without reducing the signal to noise ratio of the readout, and consequently impairing the bandwidth of the readout.

OBJECTS AND ADVANTAGES OF THE INVENTION

Accordingly several objectives and advantages of the present invention are:

(a) to provide a method to improve the signal to noise ratio of the optical recording and readout to allow the storage of high densities of information on the order of $10^9$ bits per square centimeter (b) to increase the readout or retrieval rate of data to the 100 Mb/sec rate while keeping error rates low (c) to provide an optical readout means with a novel electronic tracking method based on the use of a plurality of photo-detectors arranged in an array.

Further objects and advantages of this invention will become apparent from a consideration of the drawings and ensuing description.

SUMMARY OF THE INVENTION

In accordance with the illustrated preferred embodiment, a high density optical information storage and readout system is presented having a high data readout rate.

The system consists of:

(a) A record carrier upon which the information is stored in the form of continuously varying optical phase delays between two light beams focussed on two adjacent micron sized spots or marks. A given phase delay represents a unique numerical value. The range of values that can be recorded as a phase delay between two spots is limited on the low side by the smallest resolvable phase delay and on the high side by the largest unambiguous delay of half a wavelength. By utilizing light interferometry, extremely small phase delays on the order of one ten-thousandth of a wavelength can be measured. The range of values that can be stored per spot is therefore on the order of: $(\lambda/2)/(\lambda/10000)=5000$ per mark. Realizing that 5000 approximately equals $2^{12}$, this is equivalent to storing 12 bits of information per mark.

The phase delays are realized in a first embodiment as surface steps of controllable size substantially between one ten-thousandth and one half wavelength.

In a different embodiment the phase delays are realized as index of refraction changes between adjacent spots on a thin transparent film coating the surface of the record carrier. When an optical beam traverses the thin transparent film at a given spot it suffers a phase delay proportional to the index of refraction at that spot. What is unique to this invention is that the index changes are controllable to induce phase delays, substantially between one ten thousandth and one half of $\pi$ radians where $\pi=3.1415$; and readable with high signal to noise ratio.

(b) A means for reading the data by deriving two light beams propagating in slightly different directions, from a single optical source, focussing said beams onto adjacent spots on the record carrier, collecting the reflected light beams, recombining them an directing them upon a light detector or array of detectors where they interfere. The resulting light intensity I at position (x,y) of the detector plane is related unambiguously to the phase delay $\phi(\xi,\mu)$ by the relation $I=[A \sin(\phi+\delta)]^2$, provided the phase delay does not exceed pi radians. Here $\delta$ is a constant delay introduced by the optics and A=light field amplitude.

The use of such a differential interferometry technique to read the phase differences guarantees the best signal to noise ratio in the presence of various perturbations in the common phase of the two optical beams, such as may be induced by changes in the distance from the optics to the record carrier, by dust particles or by thermal effects.

(c) A method of writing phase delays on the order of one ten-thousandth of a wavelength between adjacent spots on the record carrier. In the case of surface phase steps, the writing can be done by a repeated masking and etching technique of record carriers. Said record carriers are made of, but not limited to, Silicon, Glass, or Aluminum. In a first step a mask is applied that exposes only the spots to be etched to the deepest level. After etching, a second mask exposes the deepest and second deepest spots, and so on. After N steps of masking and etching, N levels can be obtained. The resulting "master" record carrier is then replicated onto numerous polymeric record carriers by utilizing standard replication techniques such as stamping or injection molding,that are capable of replicating surface features down to a nanometer resolution.

Alternatively the writing can be done directly by a focussed light beam that induces according to its amplitude, a controllably small change in the index of refraction of a thin layer of transparent material previously doped with a small amount of light sensitizing material. The light sensitizing dopant could be but is not limited to Germanium oxide, Erbium oxide, Ytterbium oxide, Samarium oxide or any of the rare earth oxides also known as Lanthanide oxides, or iron in any of its oxidation states.

DESCRIPTION OF THE DRAWINGS

In the drawings closely related figures have the same number but different alphabetic suffixes.

List of Reference Numerals

| | |
|---|---|
| 1 Light source | 19 Etched substrate |
| 2 collimating lens | 20 New layer of photoresist |
| 3 polarizer | 21 Subsequent mask |
| 4 beam splitter | 22 Thin layer of light sensitized material. |
| 5 Nomarski prism | |
| 6 Focussing lens | 23 Record carrier substrate |
| 7 Record carrier | 24 High brightness light source |
| 8 Polarization analyzer | 25 Focussing lens |
| 9 Light detector or array of detectors | 26 Data mark with modified index |
| 10 Electronic multiplexer | 27 Reflective layer |
| 11 Analog to digital converter circuit | 28 Light absorbing layers |
| 12 Amplifier circuit | 29 Transparent layers |
| | 30 Pit of depth $\frac{1}{4(2^m)}$ at data |
| 13 Electrical decoupling means | 31 Pit of depth $\frac{2}{4(2^m)}$. |
| 14 Electronic integrating circuit | |
| 15 Electromechanical actuator | |
| 16 Record carrier substrate | |
| 17 Thin layer of photoresist | |
| 18 First sequence photolithography mask | |

DESCRIPTION OF THE INVENTION

Figure 1A:
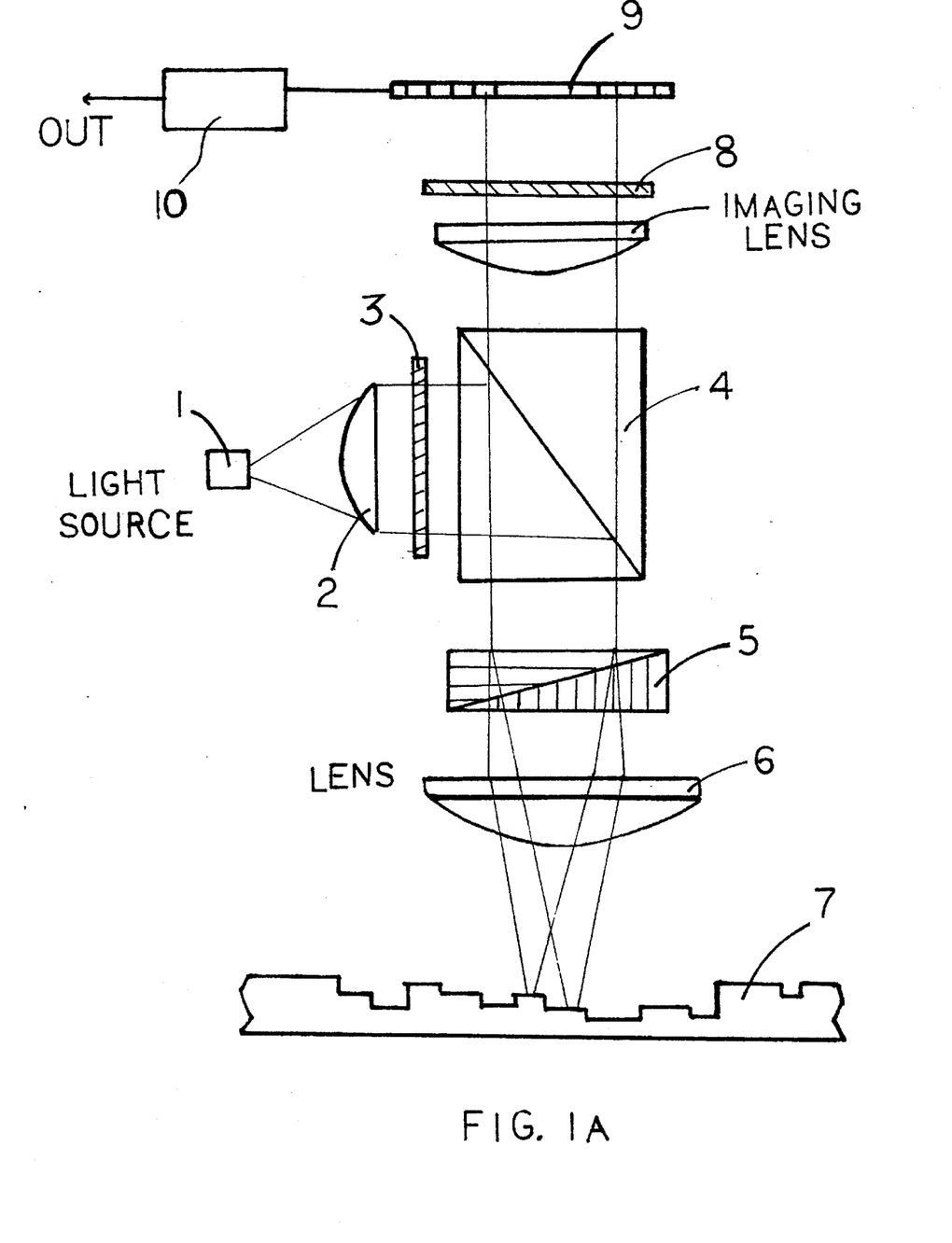
FIG. 1A illustrates a preferred embodiment of this invention utilizing a Nomarski prism to split a light beam into two slightly angularly separated components.

FIG. 1 illustrates a preferred embodiment of this invention where light from a source 1 is collimated by a lens 2 and directed by beam splitter 4 to a Nomarski prism 5 where it separates into two orthogonally polarized beams propagating in slightly different directions. The two beams are focussed by objective lens 6 onto the surface of the record carrier where they form two spots separated by a distance substantially between 250 nanometers and 10,000 nanometers. The light beams impinge on a reflective film on the record carrier 7 and are substantially reflected back into the focussing lens 6 and to the Nomarski prism 5 where they are recombined and travel through the beam splitter 4 and a polarizer 8 to a detector or a detector array 9.The light intensity at the photodetector is a measure of the phase delay between the two beams. The output of a particular detector in the array is selected by a multiplexer 10, such as the F 100363 device made by National Semiconductor, amplified by an appropriate amplifier 12 and digitized by an analog to digital converter 11, such as the Comlinear CLC 920.

In the case where the size of the light source 1 is such that it is imaged into two, one micron sized spots on the record carrier, and back to a single detector, the signal at time t at the detector is given by:

$$I(x,y,t) = A_1 A_2 (sin(\phi(\xi, \zeta, t) + \delta))^2.$$

where A1 and A2 are the amplitudes of the light fields of the incident beams, x,y the coordinates of a pixel on the detector array plane, $\xi, \zeta$ are corresponding coordinates on the record carrier plane, and $\delta$ is a constant phase delay due to the optics. In practice A1, A2 and $\delta$ will drift with time and thermal changes. To counteract this drift a surface step or phase delay of known predetermined size is written on the disk at determined intervals of S data marks. The system thus recalibrates its analog to digital conversion every S data readouts.

When the record carrier is moving with velocity v, the phase difference $\phi$ varies in a complex manner that depends on the relative size of the data marks and the beam spots. There is a short time interval equal to (Wm–Ws)/v, where Wm is the width of the data mark and Ws the width or waist diameter of the light spot, during which the phase delay $\phi$ is constant.

An analog to digital converter circuit 11 such as the CLC 920, can sample and holdconvert the phase signal during that interval. The converter then has Wm/v seconds to settle. As an example if v is 10 m/sec and Wm=1 micron=$10^{-6}$ m, then the settling time is $10^{-6}/10 = 10^{-7}$ sec or 0.1 microsecond. At the end of this interval up to twelve data bits will be output by the A/D in parallel on a 12 bit bus, making the readout rate 120 megabits/sec.

Parts of the light beams are diffracted into other directions by the structure on the surface of the record carrier and can be used to control the tracking of the data tracks by the optical head in the standard manner known in the prior art and described by A. Marchant in his book "Optical Recording", p. 172, Addison-Wesley, (1990), thus making this system compatible with practiced methods of tracking. The system is also compatible with practiced methods of focus control that keep the record carrier positioned at the focus of the readout lens. The light source 1 emits light of short coherence length preferrably shorter than a millimeter, or equivalently light of broad spectral distribution, preferrably 20 nanometers or broader. The purpose of this short coherence length is to prevent unwanted interferences between spurious reflections from various optical elements in the readout head.

In a different embodiment, the light source 1 can be made larger than the size of one data mark, it can be imaged onto the surface of the record carrier and illuminate a plurality of data marks. Each data mark can then be imaged onto one of a plurality of detectors 9. In this fashion the data can be read out in parallel. When N detectors are utilized, N marks can be read out by electronic scanning in a time interval T, thus increasing the rate of readout by a factor N. The detectors can be in a linear array or a two dimensional array such as in a CCD camera array.

Figure 2:
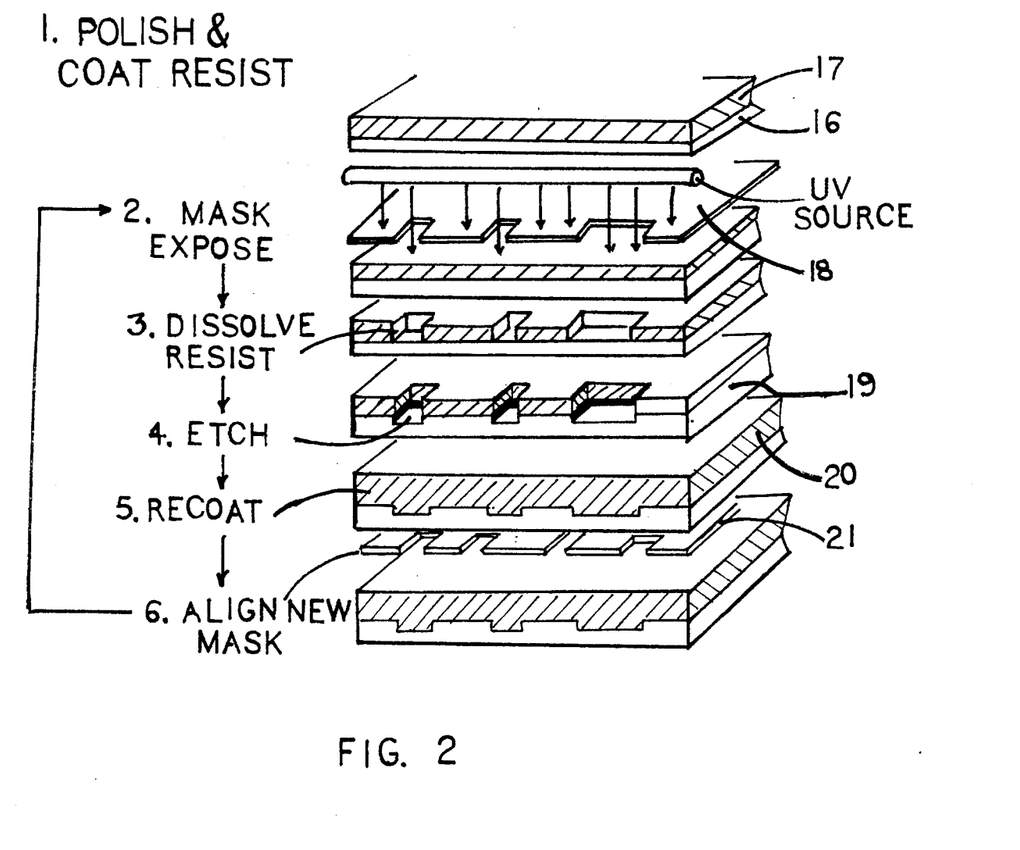
FIG. 2 illustrates the steps of preparing a stamper for the replication of record carriers by utilizing a technique of repeated masking and etching.

FIG. 2 illustrates a method of generating a master record carrier. The information to be stored is first coded and sent through a digital to analog converter which codes every M bits of data into a numerical value U(M). The sequence of numerical values are then used to generate a series of $2^M$ photolithography masks 18. A procedure is to parse the sequence into a first sequence where only the largest numerical values are replaced by ones and all others replaced by zeroes; a second sequence where the largest and second largest values are replaced by ones and all other values replaced by zeroes and so on till the $2^{M-1}$st sequence is reached, where all but the smallest value are replaced by ones. Each of these $2^{M-1}$ sequences is then laid out onto a transparency in the image of the record carrier with all zeroes being transparent and ones opaque so as to form a two dimensional mask 18. The sequences can be laid out in a spiral manner, duplicating the traditional way data tracks are laid out on a record carrier, or any other manner, provided the manner is consistent with the layout of subsequent sequences. In FIG. 2 a record carrier disk 16 is first coated with photoresist 17. The mask 18 of the first sequence is then used to expose the photoresist to UV radiation. The exposed photoresist is dissolved away leaving a resist mask that duplicates the sequence of 1s and 0s. The disk is then etched in a corrosive etchant such as a buffered solution of potassium hydroxide which etches Silicon or silica. The etching creates pits of a controlled depth in the locations corresponding to the 1s. The etched disk 19 is then recoated with photoresist 20 and the mask 21 from the second sequence is laid over it and used to expose it to UV radiation. This series of processes is repeated $2^{M-1}$ times each time using the appropriate mask.

Figure 3:
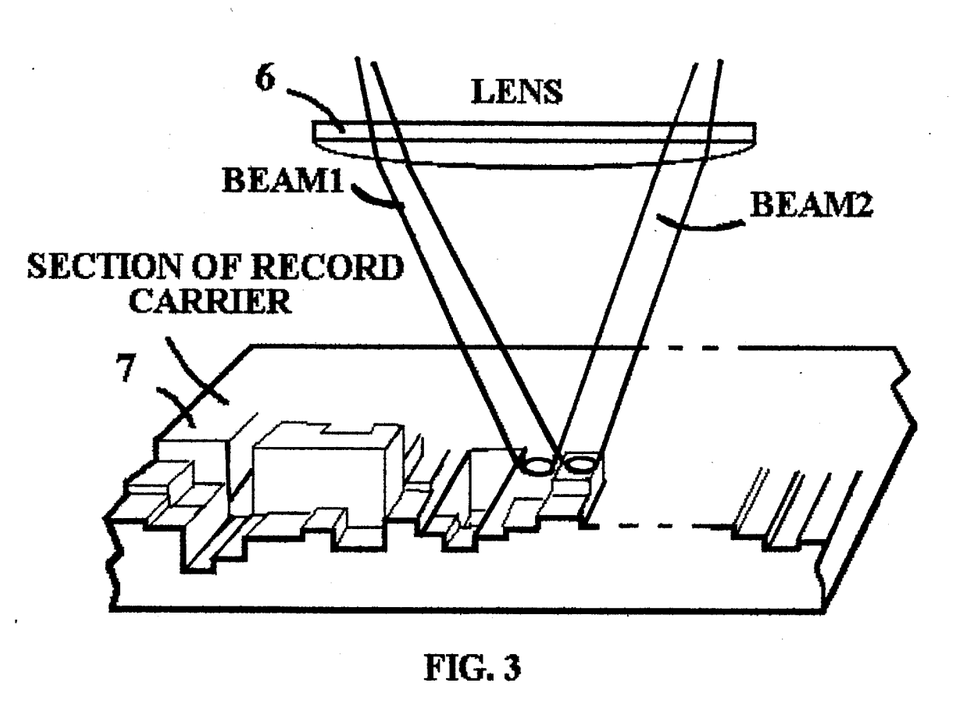
FIG. 3 illustrates a detail of surface steps.

The result is that the pits corresponding to the largest data values are etched $2^{M-1}$ times resulting in the deepest pits. The pits corresponding to lesser values are etched proportionally less times and are therefore proportionally less deep as shown in FIG. 3.

The coding mentioned earlier is necessary because the data is stored as differences in pit depths between one mark and the adjacent one. Hence starting from a first reference of 0 depth, the next depth is equal to the first data value, the second depth is equal to the sum of the first and second data values, and so on. Obviously this accumulation cannot go on indefinitely for soon the ith depth will exceed the maximum unambiguously codable depth of half a wavelength. This problem is easily mitigated by causing the successive changes in depth to alternate in direction. The alternation can be every data mark or once every number J of data marks, or even may be randomly varied if the readout mechanism does not distinguish a positive from a negative going step. The result of this alternation is a record carrier with a constant and controllable average depth of pits on it's surface. The finished record carrier can be coated with a transparent protective coating such as a polymeric, polyacrylate, polycarbonate or fluoropolymer to protect the data pits.

Figure 4A:
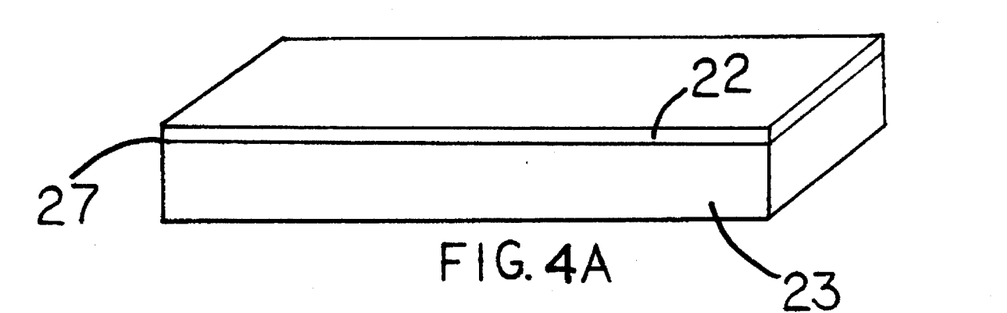
FIG. 4A illustrates a different embodiment of the record carrier where data is represented by spots of differring index of refraction.
Figure 4B:
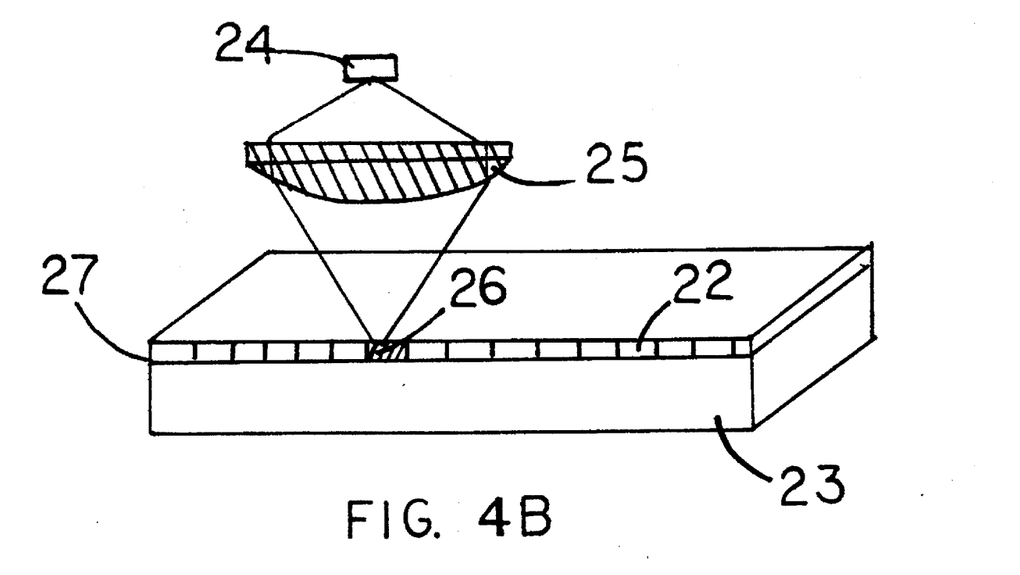
FIG. 4B illustrates an optical writing embodiment utilizing a laser to cause changes in the index of refraction of adjacent spots on a thin film.
Figure 4C:
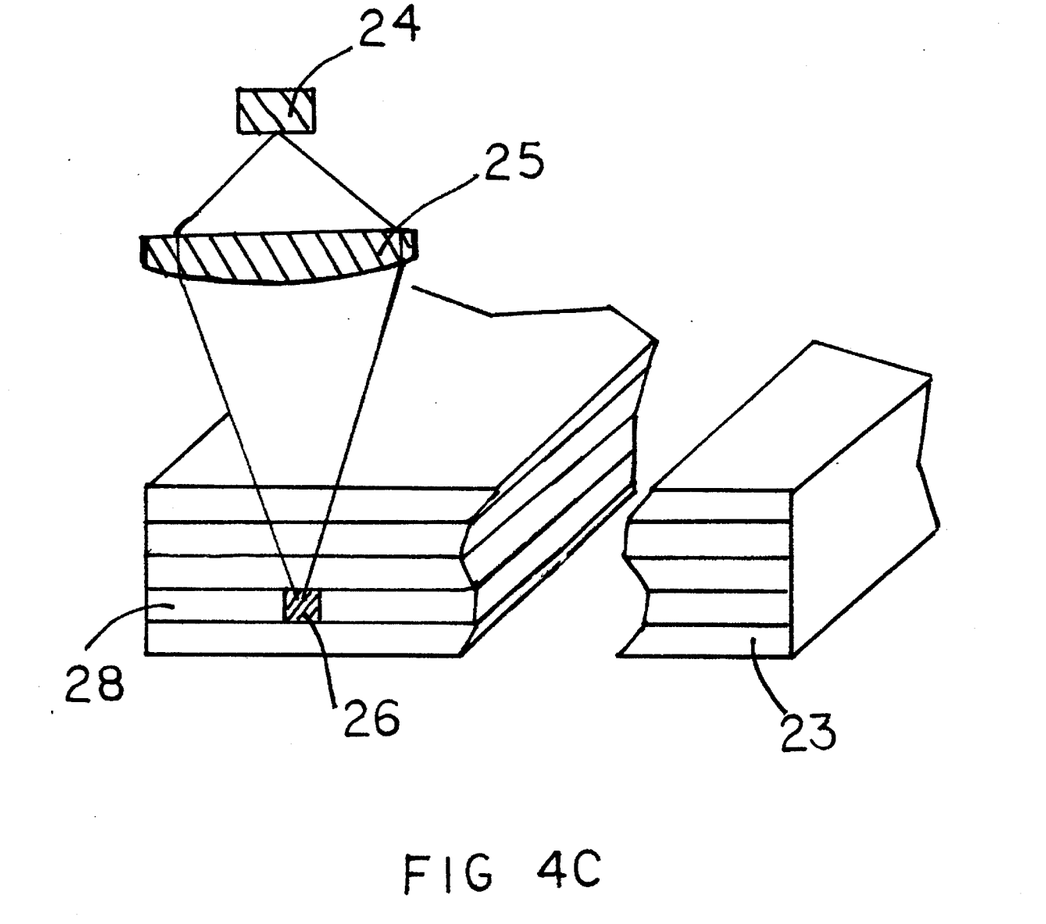
FIG. 4C illustrates an extension of the embodiment of FIG. 4A to multiple thin film layers.

FIG. 4A illustrates a different embodiment of the recording process. This embodiment utilizes the same readout mechanism described in FIG. 1A. However instead of surface reliefs the data is recorded in the form of changes in the index of refraction of a thin layer 22 of transparent material such as silica or glass, doped with Germanium oxide to induce the creation of oxygen deficiency electronic traps. Alternatively the thin film could be a light sensitive polymer such as the HRF-150 photopolymer made by Dupont or a photorefractive thin film. The thin film is coated or deposited onto a disk 23. FIG. 4B illustrates how a light beam from a source 24 of intense light is focussed by lens 25 onto the thin layer of light sensitized material to induce a change of the index of refraction therein. In this implementation a reflective surface layer 27 reflects the incident light beams back into the readout head. The phase delay suffered by each beam is proportional to the index of refraction of the thin layer 22 times twice its thickness. Normally changes on the order of 0.1 to 1 percent in the index of germania doped silica can be induced by irradiation with visible or UV light. Also changes in index of photopolymers can be achieved by visible and infrared light, the amount of change being largely proportional to the intensity times the duration of illumination. Thus by controlling the intensity or the duration of the light illumination the desired change in index between adjacent spots can be achieved. This concept can be extended to multiple thin films disposed as a stack on a disk as shown in FIG. 4C. Since the whole stack is transparent, an individual thin film layer can be accessed by focussing onto it, the depth of focus of the writing beam or readout beam being much less than the distance between two layers.

Figure 5:
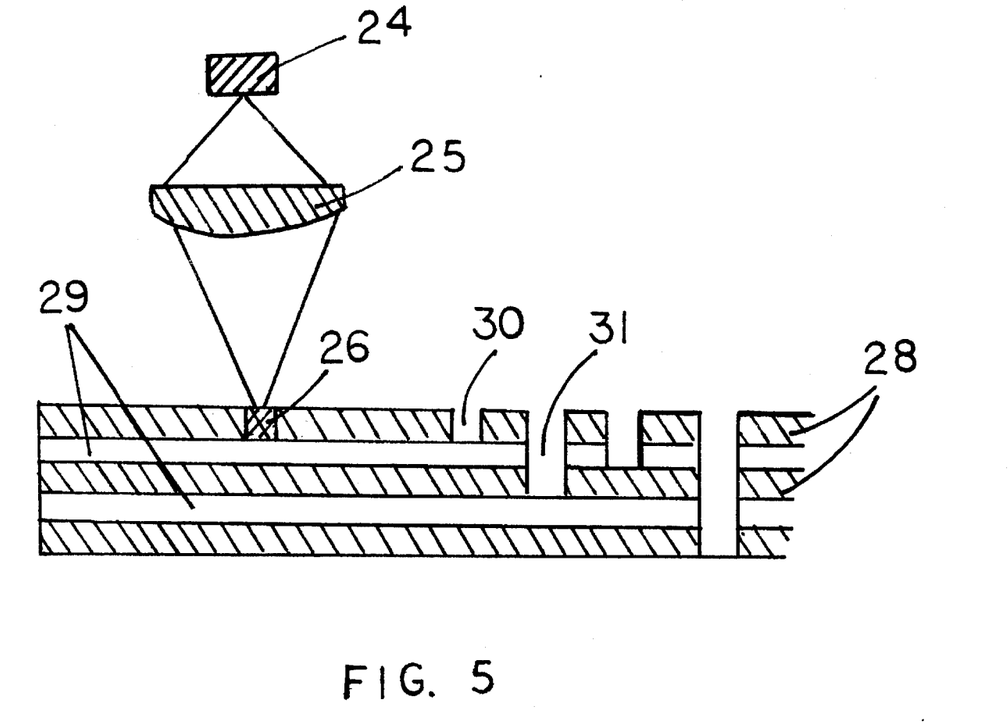
FIG. 5 illustrates a second method of writing information where repeated laser light pulses ablate a desired number of layers from a pre-formatted multilayer structure.

In a different embodiment of the record carrier and writing process, a multiplicity of alternatingly absorbing layers 28 and transparent layers 29, each of a thickness equal to a half wavelength divided by $2(2^M)$, are coated or deposited onto the laser disk. A pulse of light of the appropriate amplitude ablates one absorbing layer, creates a pit 30 of depth $\lambda/4(2^M)$, and exposes the next absorbing layer. The advantage of this approach is that it obviates the need to control the pulse energy very precisely. If the pulse is somewhat too strong, an extra depth of record carrier material would not be ablated as it is transparent. If a second light pulse hits the same mark area, it will ablate the second absorbing layer and create a pit 31 of twice the depth.

In this fashion pits of controllable depths between zero and $\lambda/2$ are created.

Operation of the Preferred Embodiment

Figure 1B:
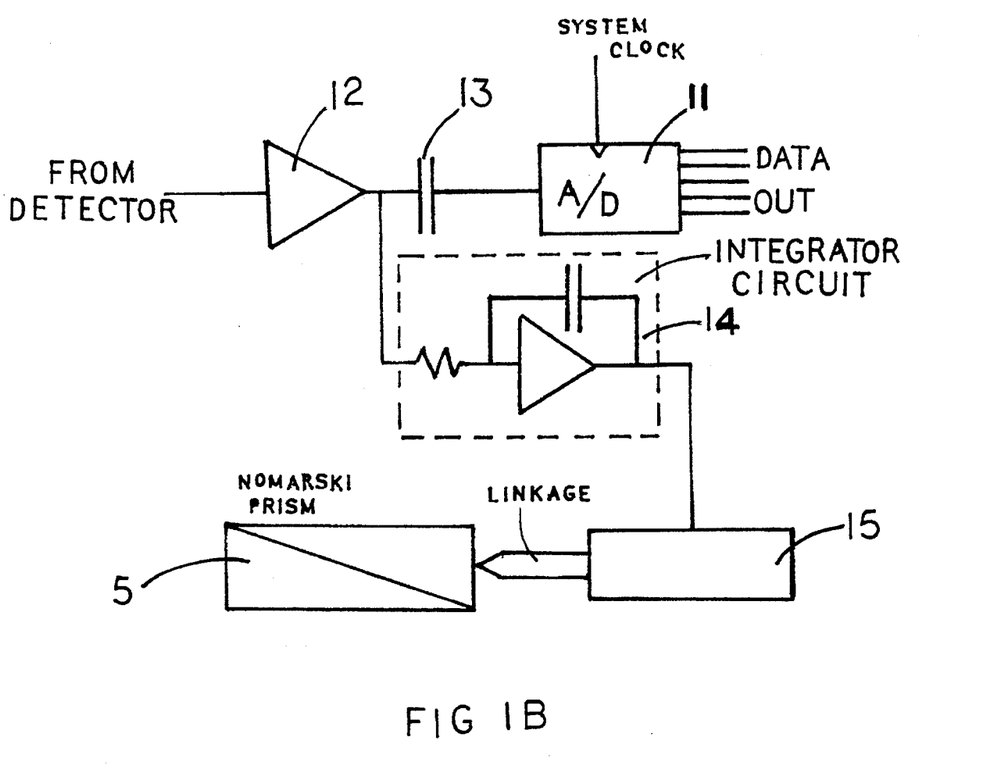
FIG. 1B illustrates a controller circuit for the readout apparatus.

FIG. 1B illustrates a control circuit for the readout apparatus.

In operation light from the source 1 is polarized by polarizing means 3 and split into two beams by means 5, said beams then being focussed onto two adjacent spots on the record carrier 7. The two said beams are reflected by the natural Fresnel reflection or by a reflective thin film coated on the surface of the record. The beams are recombined by means 5 and directed to the detector array 9 where they produce an interference pattern. The beam splitting means 5 or the polarizing means 3 are set to cause substantially ninety degrees of phase shift between the two beams. The average light intensity at the light detector 9 is then halfway between zero and its maximum value and the interferometer is in its most linear operating range. Phase changes away from this operating range that may be caused by thermal or mechanical effects are detected by the detector 9, amplified by amplifier 12 and fed back to actuator 15 via a feedback control circuit such as an integrator circuit 14. The electromechanical actuator 12 could be a piezoelectric transducer or an electromagnet or a motor, which acts on either the polarizing means 3 or the splitting means 5 to restore the system back to the operating point. The AC part of the detector 9 signal is decoupled from the DC part by a decoupling means 13 and fed to an analog to digital converter 11 such as the Comlinear Co. CLC920, where it is converted to a digital format at a precise moment in time determined by the system clock. The system clock can be derived from the AC signal pulse train or from the record carrier drive mechanism in fashions well known in the art. The function of the system clock is to insure that the detector signal is latched at a time when the two light beam focal spots straddle a given phase step on the record carrier surface.

The limit of smallest detectable light power is determined by the amount of noise on the light beams plus the noise generated in the detector and amplifier. Photoelectric semiconductor detector-amplifier combinations such as the AT&T ODL250 have sensitivities on the order of a picowatt per root Hz. Therefore in order to detect a one part per thousand change in the light intensity at the detector, corresponding in turn to one part per thousand change in phase delay, the average light intensity at the detector should then be $10^{-9}$ Watts or one nanowatt for a bandwidth of one Hertz. The light power needed for a bandwidth B would then be proportional to the square root of B. More specifically for a bandwidth of 100 MHz the light power needed would be $10^{-5}$ Watts or 10 microwatts. Such light intensities on the detector would require a source intensity of no more than 100 microwatts. Such source powers are easily achievable and the system is seen to be capable of very high signal to noise ratios and low error rates.

Conclusion, Ramifications and Scope of the Invention

Although the description above contains many specificities, these should not be construed as limiting the scope of the invention but as merely providing illustrations of some of the presently preferred embodiments of this invention. For example the record carrier can have other shapes such as a rectangular shape or a cylindrical drum shape and the data tracks thereon can be linear parallel tracks. Thus the scope of the invention should be determined by the appended claims and their legal equivalent, rather than by the examples given.

I claim:

1. In a high density optical information storage system having a light source that generates partially coherent incident light of a characteristic wavelength for illuminating simultaneously a plurality of adjacent track regions and decoding compressed information stored in said system, wherein an atomic unit of said compressed information corresponds to an M-bit word of decoded information, M being a fixed integer greater than 1, an information storage record carrier comprising:

a track structure defined on a substrate consisting of a plurality of said track regions, said M-bit word being uniquely encoded and stored as an optically-detectable difference in a common physical characteristic of adjacent, first and second track regions; such that, when said first and second track regions are illuminated simultaneously by said partially coherent incident light, a reflected light signal with corresponding first and second reflected beams results, said first and second reflected beams having, respectively, a first and second phase with a phase difference uniquely determined by said optically-detectable difference; said phase difference uniquely corresponding to said M-bit word of decoded information.

2. The record carrier of claim 1 wherein said physical characteristic is surface height of said track regions, said optically-detectable difference therefore being surface height step size measured between said adjacent track regions.

3. The storage carrier of claim 2 wherein said surface height step size is between zero and five micrometers.

4. The storage carrier of claim 2 wherein said surface height step size is a multiple of a predetermined minimum amount smaller than half of said characteristic wavelength.

5. The storage carrier of claim 2 wherein said track structure consisting of surface height steps is made by repeated lithographic masking and etching of the surface of a master record carrier, followed by the replication of numerous copies of said master record onto a plurality of polymeric record carriers by means of molding or stamping.

6. The storage carrier of claim 5 wherein the master record carrier material is silicon, glass, silica or aluminum.

7. The record carrier of claim 2 wherein said surface height steps are produced by first depositing onto said substrate a multilayer structure of alternating light absorbing and transparent layers and subsequently ablating a number of said layers at a desired position by repeated application of optical energy pulses.

8. The record carrier of claim 7 wherein said layers have a layer thickness between one tenth of a nanometer and 1000 nanometers.

9. The storage carrier of claim 1 wherein said track structure further comprises a plurality of calibration regions distributed among said track regions, one of said calibration regions separating every N pairs of said adjacent track regions, N being a fixed integer larger than 2, said calibration region being defined so as to produce a predetermined phase difference between a first beam of said light signal reflected from said calibration region and a second beam of said light signal reflected from said track region adjacent said calibration region, said calibration region thereby calibrating the readout of said compressed information from said record carrier.

10. The information record carrier of claim 1 wherein said partially coherent incident light comprises two incident light beams, each of said two incident light beams illuminating a respective one of said adjacent, first and second track regions.

11. The storage carrier of claim 1 wherein said track structure comprises a planar light reflective layer atop said substrate and an optically transmissive layer atop said reflective layer, said track regions being defined in said transmissive layer, said physical characteristic being index of refraction of said transmissive layer, said optically-detectable difference therefore being the difference in said index of refraction between said regions.

12. The storage carrier of claim 11 wherein said transmissive layer is a glass film or silica film doped with germanium oxide or a Lithium Niobate film or a Barium Titanate film doped with iron ions or a photopolymer film.

13. The storage carrier of claim 11 wherein the product of said difference in said index of refraction between said adjacent track regions and the thickness of said transmissive layer varies between zero and half of said characteristic wavelength.

14. The optical information storage system of claim 1 having a transducer head comprising:

(a) a light source emitting partially coherent light whose coherence length is between one micrometers and several centimeters;

(b) a means for splitting the light form the source rate a first set of two orthogonally polarized light beams propagating in different directions and for recombining a second set of two reflected light beams propagating in reverse directions to the first set into a single beam;

(c) a means for focusing said first set of light beams onto adjacent incremental positions on a record carrier, resulting in generation of said two reflected light beams reflected back from the record carrier, and simultaneously collecting and collimating said reflected light beams; and (d) a means for directing the single beam or part thereof, onto an optical detector.

15. The transducer of claim 14 wherein the means for splitting the light into two orthogonally polarized beams is a Nomarski prism.

16. The transducer of claim 14 wherein the optical detector array is a plurality of independent charge coupled detectors and where the outputs of said detectors may be sampled either simultaneously or sequentially in time.

17. The transducer of claim 14 wherein the wavelength of said light is between 100 nanometers and 10,000 nanometers.

18. The transducer of claim 14 wherein the aperture of said light source is between one hundred nanometers and ten millimeters in diameter.

19. An optical information storage system comprising:

(a) a light source emitting partially coherent light whose coherence length is between one micrometer and several centimeters;

(b) a means for splitting the light from the source into a first set of two orthogonally polarized beams propagating in different directions and for recombining a second set of two reflected light beams propagating in reverse directions to the first set into a single beam;

(c) a means for focusing said first set of light beams onto adjacent incremental positions of a record carrier, resulting in generation of said two reflected light beams reflected back from the record carrier, and simultaneously collecting said reflected light beams;

(d) said record carrier having a track structure consisting of a plurality of said adjacent incremental positions, a M-bit information word being stored on said record carrier as an optically detectable difference in a physical characteristic of said adjacent incremental positions, said difference being detectable as a difference in phase of said reflected light beams, said difference in phase varying in small steps between zero and one half of a wavelength of said light source in small steps; and (e) a means of directing the single beam or part thereof, onto an array of optical detectors.

* * * * *